United States Patent
Pratt et al.

(10) Patent No.: US 12,348,835 B2
(45) Date of Patent: Jul. 1, 2025

(54) SYSTEM AND METHOD FOR IMPROVED DETERMINATION OF SATELLITE INTERFACE TYPE

(71) Applicant: ARRIS ENTERPRISES LLC, Suwanee, GA (US)

(72) Inventors: Paul Richard Pratt, Wakefield (GB); Robert Michael Payne, Keighley (GB)

(73) Assignee: ARRIS ENTERPRISES LLC, Horsham, PA (US)

(*) Notice: Subject to any disclaimer, the term of this patent is extended or adjusted under 35 U.S.C. 154(b) by 165 days.

(21) Appl. No.: 18/273,607

(22) PCT Filed: Jan. 28, 2021

(86) PCT No.: PCT/US2021/015413
§ 371 (c)(1),
(2) Date: Jul. 21, 2023

(87) PCT Pub. No.: WO2022/164432
PCT Pub. Date: Aug. 4, 2022

(65) Prior Publication Data
US 2024/0080535 A1  Mar. 7, 2024

(51) Int. Cl.
*H04N 21/658* (2011.01)
*H04N 21/442* (2011.01)
*H04N 21/61* (2011.01)

(52) U.S. Cl.
CPC ... *H04N 21/6582* (2013.01); *H04N 21/44209* (2013.01); *H04N 21/6143* (2013.01)

(58) Field of Classification Search
CPC ......... H04N 21/6582; H04N 21/44209; H04N 21/6143; H04N 21/42607; H04Q 2213/333; H04H 40/90
See application file for complete search history.

(56) References Cited

U.S. PATENT DOCUMENTS

| | | |
|---|---|---|
| 6,687,486 B2 | 2/2004 | Grzeczkowski |
| 7,739,717 B1 | 6/2010 | Kuether et al. |
| 2003/0069960 A1 | 4/2003 | Symons et al. |
| 2003/0143946 A1* | 7/2003 | Grzeczkowski ... H04N 7/17309 348/E5.006 |
| 2010/0042708 A1* | 2/2010 | Stamler ............... G06Q 10/087 709/221 |

(Continued)

FOREIGN PATENT DOCUMENTS

WO  2021247019 A1  12/2021

OTHER PUBLICATIONS

International Search Report and the Written Opinion of the International Searching Authority, dated Apr. 12, 2021, issued in corresponding International Application No. PCT/US2021/15413, 18 pgs.

*Primary Examiner* — Adil Ocak
(74) *Attorney, Agent, or Firm* — Panitch Schwarze Belisario & Nadel LLP

(57) ABSTRACT

A system and method enabling the automated installation and configuration of satellite system premises device. The system and method utilize stored information indicative of the types of viable interfaces that a premises device should be adapted to mate with, to intelligently recognize a particular subset of satellite system signals, and then responsively configure and install a premises device.

20 Claims, 3 Drawing Sheets

(56) References Cited

U.S. PATENT DOCUMENTS

2011/0149720 A1\* 6/2011 Phuah ................. H04L 43/0811
  370/216
2017/0366845 A1   12/2017 Friel et al.
2019/0319718 A1\* 10/2019 Williams ........... H04B 17/0085

\* cited by examiner

SYSTEM AND METHOD FOR IMPROVED DETERMINATION OF SATELLITE INTERFACE TYPE

BACKGROUND OF THE INVENTION

Satellite provision of broadband media remains a popular option for consumers, especially those who find themselves in markets that are underserved by terrestrial broadband providers. A typical consumer system would consist of an external dish antenna, a signal upconverter/downconverter (usually co-located with the dish), and a premises device (a "set-top box") incorporating a tuner, a user interface and a video output.

Broadband service providers, including satellite service providers, increasingly rely upon the consumer for installation of the set-top box. This reliance offers the consumer the flexibility of upgrading or replacing a set-top box without scheduling a service call, and reduces the burden placed upon service provider technicians. Although such do-it-yourself installation of set-top boxes offers advantages to both the consumer and the service provider, satellite system set-top boxes can pose a particular technical challenge for untrained consumers.

Presently, satellite broadband systems can connect to a set-top box via one of three different and incompatible interfaces: i) a universal low-noise block ("ULNB") interface utilizing either one or two connections to the set-top box; ii) a single-cable second-generation interface utilizing a single connection to the set-top box; or iii) a wideband low-noise block ("WLNB") interface utilizing two connections to a set-top box. To an untrained consumer presented with one or more unlabeled cables and a set-top box having any number of input and/or output jacks, the installation of a satellite set-top box could prove a confusing task. Such confusion is likely to result in an improper or ineffective installation, causing loss of service, consumer dissatisfaction, and the possible need for the service provider to dispatch a technician to correct the problem. All undesirable outcomes for both the consumer and the provider.

A system and method for an improved automated process enabling the installation of satellite system consumer premises devices, such as set-top boxes, was disclosed in commonly-assigned Patent Application No. PCT/US20/35965, filed on Jun. 3, 2020. However, even the automated process described in the referenced patent application can be further improved upon so as to provide an even more efficient means of configuring a premises device to mate with a satellite interface.

BRIEF SUMMARY OF THE INVENTION

A system and method enabling the automated installation and configuration of satellite system premises device. The system and method utilize stored information indicative of the types of viable interfaces that a premises device should be adapted to mate with, to intelligently recognize a particular subset of satellite system signals, and then responsively configure and install a premises device. The system and method are also adapted to provide a consumer and/or satellite service provider with feedback regarding the installation and the connection of interface cables.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
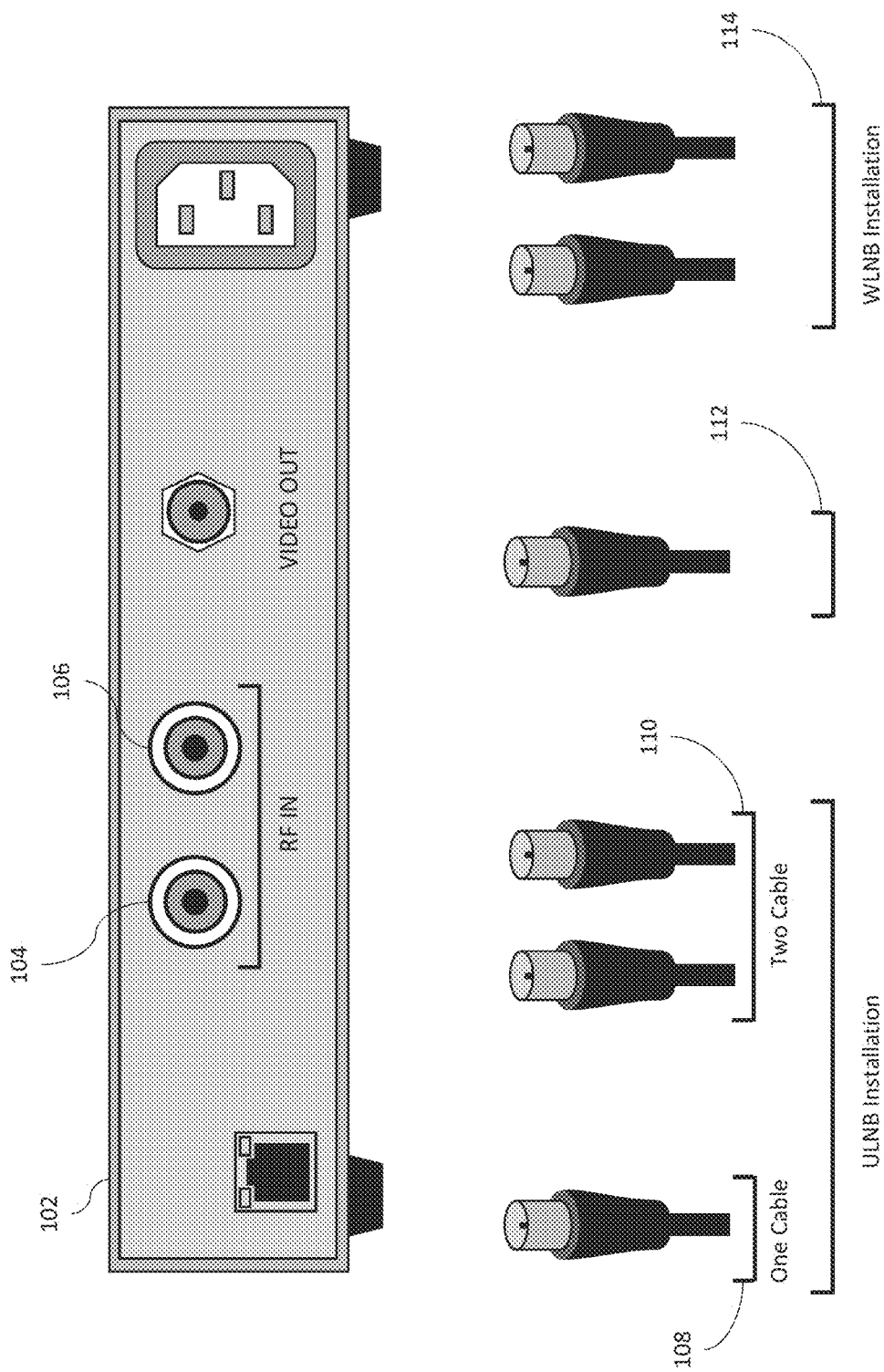
FIG. 1 is a diagram of a representation of the rear panel of a satellite set-top and RF cables adapted to connect thereto.

Typically, the set-top boxes utilized by satellite service providers for supporting residential broadband services are adapted to be compatible with multiple installation configurations. The operation of such set-top boxes is typically governed by an internal controller comprised of at least one processor and associated memory. FIG. 1 provides a simplified representation of the rear panel of a satellite set-top box 102, including female radio-frequency ("RF") input connectors 104 and 106. These connectors are typically adapted to accept L-band RF signals. In a given residential installation, a consumer would be required to connect one or more RF cables to these input connectors. At present, satellite broadband systems typically connect to a set-top box via one of three different interfaces: i) a ULNB interface; ii) a single-cable second-generation interface; or iii) a WLNB interface. As shown in FIG. 1, a ULNB installation may require the connection of one cable (108) or two cables (110), a single-cable second-generation installation requires only a single cable to be connected (112), and a WLNB installation will require the connection of two cables (114) to the set-top box. Following the successful connection of the proper cable(s) to the proper input connector(s), a correctly adapted set-top box will provide the consumer with access to the appropriate broadband services.

However, to an untrained consumer, two ULNB cables (110) would likely appear identical to two WLNB cables (114). Likewise, a single ULNB cable (108) would be indiscernible from a single-cable second-generation cable (112). So as to enable and optimize the proper set-up of the set-top box and the correct and efficient provisioning of user bandwidth and services, the set-top box controller executes an automatic installation detection process as detailed below.

Figure 2:
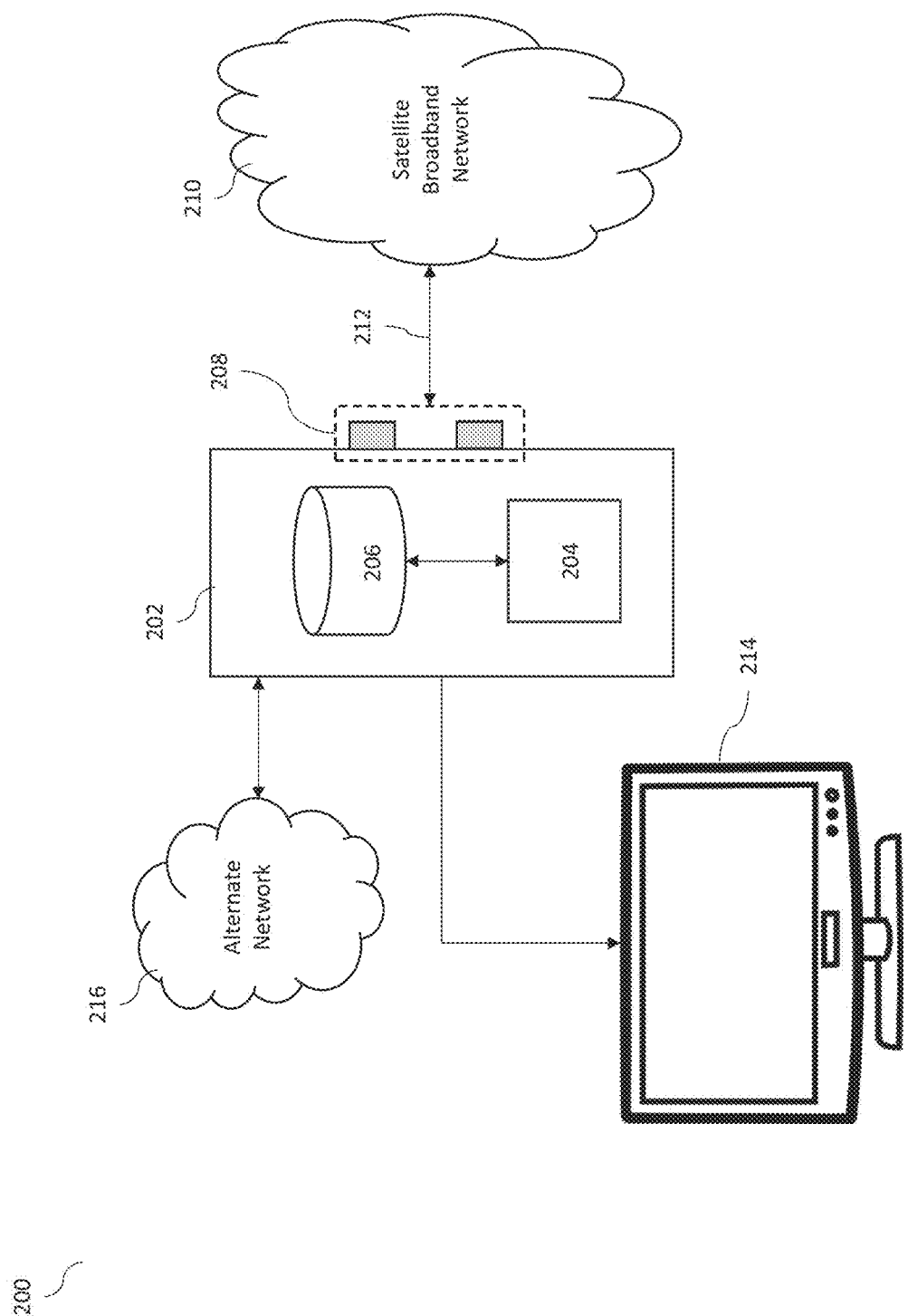
FIG. 2 is a functional block diagram of a system supporting the implementation of a pre-programmed installation sequence in accordance with an embodiment of the invention.

FIG. 2 provides a block diagram of a system supporting the implementation of a pre-programmed installation sequence in accordance with an embodiment of the invention. The system includes set-top box 202 (similar in configuration to set-top box 102 of FIG. 1). As shown, set-top box 202 includes processor 204 linked to memory 206. One or both of the RF connectors (208) are linked to satellite broadband network 210 via interface 212. Set-top box 202 is also shown to be linked to display 214 (a television, monitor, tablet or smartphone), and to alternate network 216. Alternate network 216 can be a wired or wireless network that can support a communication link to the satellite service provider ("SSP") exclusive of satellite broadband network 210. Such a communication could be established, for example, via a telephone network (wired or cellular) or Internet connection.

Once the consumer has connected the available cable(s) to the RF connector(s), processor 204 within set-top box 202 is initialized and a pre-programmed sequence of steps (300) is executed. This pre-programmed installation sequence is executed in accordance with instructions stored within memory 206 of satellite set-top box 202. These instructions, having been stored within memory 206 by the SSP, are customized for the specific environment in which set-top box 202 will operate. The instructions will cause the set-top box to execute an interface detection process that tests for a limited set of specific conditions indicative of the possible type or types of interfaces to which the set-top box is intended to mate with. This limited set of conditions enables the installation process to be streamlined; avoiding a delay that would be introduced if testing was performed for every type of interface that could reasonably be supported by one or two RF connectors.

Figure 3:
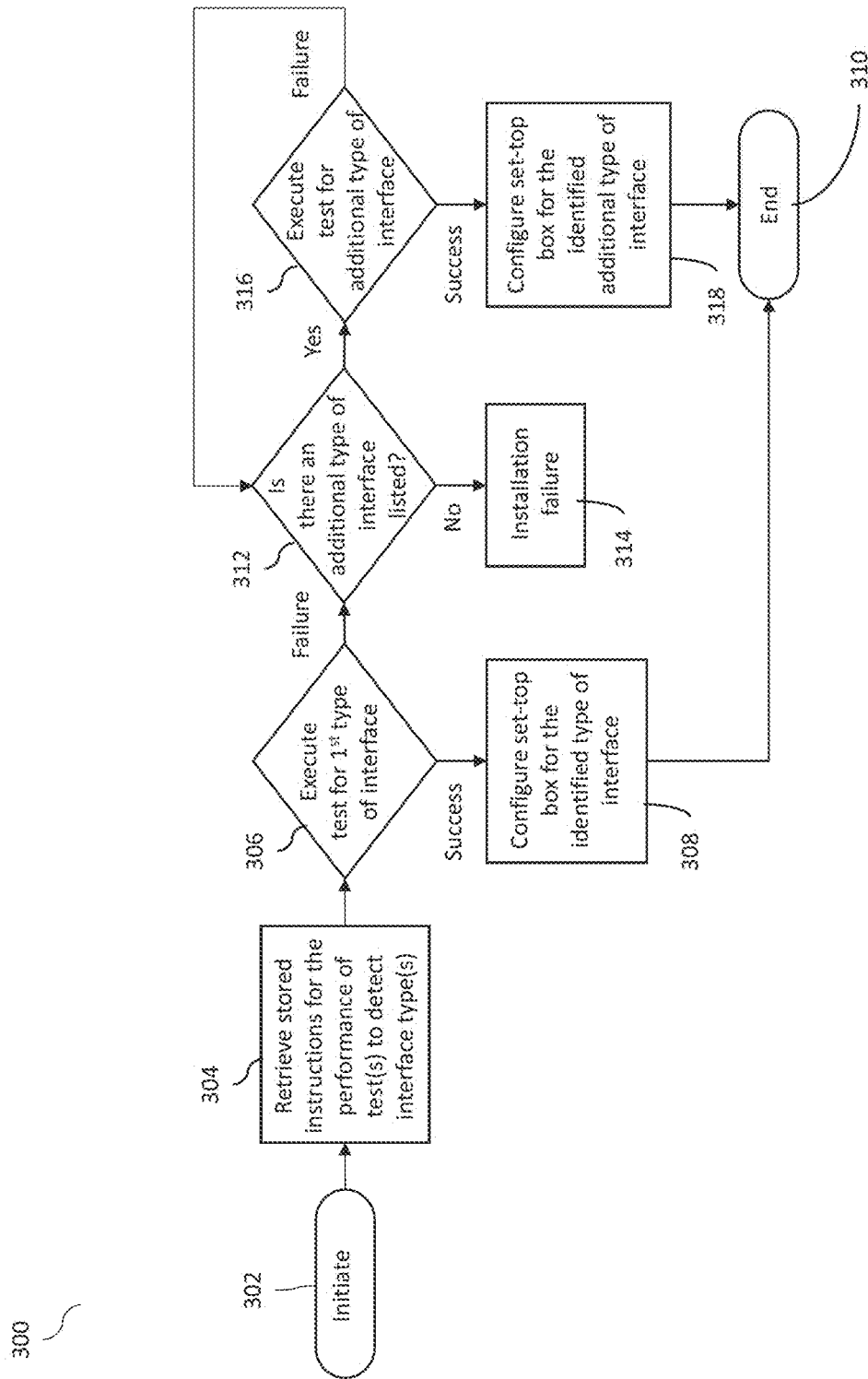
FIG. 3 is a flow diagram of a process implementing a pre-programmed installation sequence within the system of FIG. 2.

FIG. 3 provides a flow diagram of the process that would be carried by a set-top box adapted to implement a pre-programmed installation sequence in accordance with an embodiment of the invention. For purposes of illustration, assume that the SSP deploys set-top boxes to environments that utilize either a single cable second-generation interface, or a WLNB interface. Consequently, the SSP has stored instructions within each set-top that will be deployed in these environments to first test or a single cable second-generation interface, and then for a WLNB interface. Upon initialization (step 302), a processor within the set-top box retrieves instructions for the performance of interface tests to determine the type of interface to which the set-top box is mated (step 304). In the instant case, the first test to be performed (step 306) would be one for the detection of a single cable second-generation interface. This detection, as well as the detection of other cable interface configurations referenced in this embodiment, involves the set-top box sending a message in accordance with the Digital Satellite Equipment Control ("DiSEqC") 2.0 protocol to upstream provider-controlled equipment. This signal is sent out via both of the set-top RF connectors (104 and 106 of FIG. 1). The set-top box then determines if the upstream equipment has returned a response confirming that the installation should proceed as a single-cable second-generation installation. If this test were to be successful, the process would continue with step 308 and the set-top box would be configured to mate with a single cable second-generation interface. The interface determination process would then terminate (step 310).

If the test for a single cable second-generation interface failed at step 306, the processor would determine if the retrieved instructions indicated that there were one or more additional interface types to be tested for (step 312). If there were no such additional interface types provided for, the installation would terminate in failure at step 314. Such failure could initiate the generation of a failure message to the consumer via a display 214, or to the SSP via alternate network 216 (if such was available). However, as stated above, in this case the SSP provided instructions for the set-top box to test for both a single cable second-generation interface and a WLNB interface. The process would continue with step 316 and the set-top box processor would execute a test for a WLNB interface. Such a test could be based upon a list of specific frequencies stored within the set-top box memory, or via a full-spectrum scan, or both, in accordance with the stored SSP instructions. If the test for a WLNB interface was successful, the process would continue with step 318 and the set-top box would be configured to mate with a WLNB interface. The interface determination process would then terminate (step 310).

If the test at step 316 failed, the process would revert back to step 312 where the processor would determine if there was yet another additional type of interface to tested for. In this particular example, limited to a single cable second-generation and a WLNB interfaces, there is not, and the installation would terminate in failure at step 314.

The process depicted in FIG. 2 could be applied to enable the installation of set-top boxes in environments ranging from those with just a single type of interface, to those having any number of different types. The process would only be limited by the number of interface types for which instructions had been stored within the memory of a given set-top box. The process optimizes the installation process so that any given set-top box never tests for an interface type that isn't going to be found within the given network environment. In the above case, the set-top box was never instructed to test for a ULNB interface, because the SSP knew that no such interfaces were supported within the network environment. The process could be further optimized by the prioritization of the types of available interfaces. In the above example, the set-top box tested for a single cable second-generation interface before it tested for a WLNB interface. This prioritization of the single cable second-generation interface testing could have been dictated by the SSP because that type of interface was most prevalent within the network environment, and consequently was statistically more likely to meet with success than a test for a WLNB interface. This type of prioritization could be applied by an SSP to dictate the order of testing for any number of interface types by a set-top box.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. For example, the connectors could be any type of terminal adapted for the transmission and reception of RF signals or streams, and the RF streams and signals could be of any frequency or band. Furthermore, the invention could be implemented in a single unitary device, or across multiple networked devices.

The invention claimed is:

1. A system for automating the installation of a broadband satellite system premises device, comprising:
   a plurality of terminals, each adapted to receive an individual radio-frequency stream;
   a memory; and
   a processor adapted to:
      retrieve from the memory information indicative of the performance of a plurality of tests, each of which is adapted to detect a specific type of satellite network interface;
      perform at least a first test in accordance with the retrieved instructions;
      recognize a specific satellite network interface type based on the first test; and
      configure the broadband satellite system premises device for a specific installation based on at least the recognition of a specific satellite interface type.

2. The system of claim 1 wherein performing at least a first test comprises testing for at least one of the following satellite interface types:
   a single cable second-generation interface;
   a wideband low-noise block interface; and
   a universal low-noise block interface.

3. The system of claim 1 wherein the information indicative of the performance of a plurality of tests is specified by a satellite service provider.

4. The system of claim 1 wherein the broadband satellite premises device is a set-top box.

5. The system of claim 1 wherein the controller is further adapted to generate a message upon failure to configure the broadband satellite system premises device.

6. The system of claim 5 wherein the generated message is presented upon a display linked to the broadband satellite system premises device.

7. The system of claim 5 wherein the generated message is transmitted to a satellite services provider via an alternate network linked to the broadband satellite system premises device.

8. The system of claim 7 wherein the alternate network comprises at least one of the following:
   a telephone network;
   a wireless network; and
   an Internet connection.

9. The system of claim 1 wherein:
   the information indicative of the performance of a plurality of tests comprises a prioritized listing of tests adapted to detect a specific type of satellite network interface; and
   wherein performing at least a first test comprises the performance of each of the plurality of tests in priority order, until performance of a given test results in the recognition of a specific satellite network interface type.

10. The system of claim 9 wherein the prioritization of the listing of tests is based, at least in part, upon the relative prevalence of particular types of satellite network interfaces within the broadband satellite network in which the broadband satellite system premises device is being installed.

11. A method for automating the installation of a broadband satellite system premises device, in a system comprising:
   a plurality of terminals, each adapted to receive an individual radio-frequency stream; and
   a memory;
   the method comprising the steps of:
      retrieving from the memory information indicative of the performance of a plurality of tests, each of which is adapted to detect a specific type of satellite network interface;
      performing at least a first test in accordance with the retrieved instructions;
      recognizing a specific satellite network interface type based on the first test; and
      configuring the broadband satellite system premises device for a specific installation based on at least the recognition of a specific satellite interface type.

12. The method of claim 11 wherein the step of performing at least a first test comprises testing for at least one of the following satellite interface types:
   a single cable second-generation interface;
   a wideband low-noise block interface; and
   a universal low-noise block interface.

13. The method of claim 11 wherein the information indicative of the performance of a plurality of tests is specified by a satellite service provider.

14. The method of claim 11 wherein the broadband satellite premises device is a set-top box.

15. The method of claim 11 further comprising the step of generating a message upon failure to configure the broadband satellite system premises device.

16. The method of claim 15 wherein the generated message is presented upon a display linked to the broadband satellite system premises device.

17. The method of claim 15 wherein the generated message is transmitted to a satellite services provider via an alternate network linked to the broadband satellite system premises device.

18. The method of claim 17 wherein the alternate network comprises at least one of the following:
   a telephone network;
   a wireless network; and
   an Internet connection.

19. The method of claim 11 wherein:
   the information indicative of the performance of a plurality of tests comprises a prioritized listing of tests adapted to detect a specific type of satellite network interface; and wherein
   the step of performing at least a first test comprises the performance of each of the plurality of tests in priority order, until performance of a given test results in the recognition of a specific satellite network interface type.

20. The method of claim 19 wherein the prioritization of the listing of tests is based, at least in part, upon the relative prevalence of particular types of satellite network interfaces within the broadband satellite network in which the broadband satellite system premises device is being installed.

* * * * *